United States Patent [19]

Jungvid

[11] 4,035,516

[45] July 12, 1977

[54] PROCESS FOR MODIFYING FEEDING MATERIAL

[75] Inventor: Hans Gustav Jungvid, Veddige, Sweden

[73] Assignee: Astra Nutrition Aktiebolag, Molndal, Sweden

[21] Appl. No.: 512,946

[22] Filed: Oct. 7, 1974

[30] Foreign Application Priority Data

Oct. 8, 1973 Sweden .............................. 7313637

[51] Int. Cl.² .......................................... A23K 1/00
[52] U.S. Cl. .................................. 426/18; 426/44; 426/46; 426/2; 426/72; 426/74; 426/623; 426/630; 426/635
[58] Field of Search ............... 426/18, 44, 447, 46, 426/72, 73, 54, 201, 208, 210; 424/94, 115, 623, 630, 635

[56] References Cited

U.S. PATENT DOCUMENTS

| | | | |
|---|---|---|---|
| 2,132,621 | 10/1938 | Horvath | 426/18 |
| 2,738,274 | 3/1956 | Le Mense | 426/18 |
| 2,942,977 | 6/1960 | Lewis et al. | 424/115 |
| 3,151,983 | 10/1964 | Ely et al. | 426/208 X |
| 3,157,513 | 11/1964 | Allen et al. | 426/18 |
| 3,244,527 | 4/1966 | Baker | 426/73 X |
| 3,438,780 | 4/1969 | Singer | 426/447 X |
| 3,455,696 | 7/1969 | Ukita et al. | 426/46 X |
| 3,701,830 | 10/1972 | Weinrich | 424/94 |

*Primary Examiner*—Raymond N. Jones
*Attorney, Agent, or Firm*—Brumbaugh, Graves, Donohue & Raymond

[57] ABSTRACT

A feeding material for carnivorous animals comprising proteins, carbohydrates, fats, minerals and vitamins, wherein the content of carbohydrates comprises cereals, which have been fermented with spore-forming hay-bacteria. Preferably, the carbohydrates are gelatinized prior to being treated with the hay-bacterias.

7 Claims, No Drawings

PROCESS FOR MODIFYING FEEDING MATERIAL

The present invention relates to a feeding material containing protein, carbohydrates, fat minerals, and vitamins, and a process for its preparation.

The object of the present invention is to obtain a feeding material especially for carnivores, which feeding material does not cause noxious changes of the microflora of the intestines of the animal or does not cause urinary trouble.

A further object of the present invention is to obtain a feeding material, the carbohydrate part of which is produced from cheap cereals.

Another object of the present invention is to obtain a process for preparing a feeding stuff for carnivores, in which process non-digestible carbohydrates are removed in such a way that disturbances of digestion are eliminated.

Dry feeds for carnivores, such as dogs, cats and minks, which feeds contain protein, fat, carbohydrates, minerals and vitamins are previously known. The carbohydrate part of such feeds comprises usually, besides starch, cellulose/hemicellulose, which is steam-treated to increase the efficiency. It has, however, been shown that such hitherto known feeds cause a change of the microflora of the intestines, as nondigestible cellulose/hemicellulose is accumulated and fermented in the large intestine, whereupon the number of aerobic bacterias, of which coliform rods constitute the main part, is increased 100-to 1000-fold. It has further been shown that animals put on such a diet are affected by very noticeable urinary troubles caused by an increased production of struvite crystals (ammonium-magnesium phosphate crystals).

These drawbacks may be eliminated per se by not using carbohydrates containing cellulose/hemicellulose or using carbohydrates having very low contents of cellulose/hemicellulose, such as polished rice. This causes, however, an undesired increase in the price of the product.

It has now surprisingly been found possible to overcome these drawbacks using cheap, carbohydrate sources containing cellulose/hemicellulose by means of the present invention, which is characterized in that the content of carbohydrates of the feed comprises cereals, which have been fermented with sporeforming hay-bacteria.

According to a preferred embodiment of the invention the carbohydrate content of the feed is gelatinized prior to fermentation by hay-bacterias, preferably Bacillus subtilis. The cereals, typically are corn, barley, wheat, rye, oats, soya beans, peas and beans.

According to a further, suitable embodiment of the invention the feed contains 30–70% by weight of carbohydrates gelatinized and fermented by means of spore forming hay-bacterias, 10–50% by weight of protein, 2–20% by weight of fat, and 2–15% by weight of minerals and vitamins. Preferably, the hemicellulose content of the final feed does not exceed 0.2% by weight.

The process according to the present invention for preparing a feeding stuff as above, is characterized by fermenting the carbohydrates of a crude feeding stuff mixture comprising cereals, by means of spore forming hay-bacterias, preferably Bacillus subtilis, (which fermentation may substantially remove the content of hemicellulose) before the feeding stuff is dried and pasteurized.

According to a preferred embodiment of the process of the invention the carbohydrates are fermented after heating of the crude feed mixture, during which heating non-haybacterias and spores of non-hay-bacterias have been killed.

According to a further, preferred embodiment the crude feeding material mixture comprising cereals, is heated suitably to gelatinize the same, after which it is mixed with the rest of the feeding material components, such as protein, fat, minerals and vitamins, whereupon, possibly after an extra addition of spore forming hay-bacterias, the carbohydrates are fermented by means of spore forming hay-bacterias, suitably at an elevated temperature, and the feeding material is shaped, dried, and pasteurized.

According to another embodiment of the invention the crude feed mixture is mixed with water in an amount of 25–50% by weight and heated, suitably to a temperature of 76°–100° C, preferably to a temperature of 76°–85° C, to gelatinize the carbohydrates, whereupon a second mixture containing the rest of the feed components is added, suitably in such a way that the amount of water now is 25–35% by weight, whereupon the content of carbohydrates is fermented for about 20 to 40 minutes by means of spore-forming hay-bacterias at an elevated temperature, suitably at 40°–55° C, and the feed material is shaped, dried, and pasteurized.

The present invention will be described more in detail in the following examples, however, without being restricted thereto.

EXAMPLE 1

A cat feed mixture was prepared in accordance with the following.

A first mixture containing the following ingredients was prepared: (the figures within brackets show the percentage in the final feed).

| | |
|---|---|
| Corn | 47.5% (18%) |
| Barley | 26.5% (10%) |
| Soya | 21.0% ( 8%) |
| Lucerne meal | 5.0% ( 2%) |

This mixture was mixed with water and steam in such an amount that the temperature was raised to 76°–80° C and the water content of the mixture was about 50% by weight. By means of this treatment a gelatinization of the starch is obtained on one hand, which is needed for dietary purposes, and a purification of the spore-forming bacterias present in the cereals and/or spore forming bacterias added to the cereals is obtained on the other hand. The selection thus obtained results mainly in the survival of only the hay-bacterias (spore forming), such as Bacillus subtilis.

The first mixture thus heated is then mixed with a second mixture containing the main part of the protein according to the following:

| | |
|---|---|
| Fish meal (whole meal) | 64.5% (40%) |
| Meat meal | 17.8% (11%) |
| Refined lard | 5.7% (3.5%) |
| Dry milk | 4.0% (2.5%) |
| Wheat germ | 3.2% (2.0%) |
| Fodder yeast | 1.6% (1.0%) |
| Minerals, vitamins | 3.2% (2.0%) |

With this addition the temperature of the total mixture fell to 50° C, which temperature then was maintained by external heat supply. Further, the amount of water was reduced to about 30%, during a continued mixing or kneading operation, and then further reduced to 25%, depending on the temperature and thus the amount of vaporization. During the kneading step the amount of surviving hay-bacterias as well as spores was increased from about 50,000 to about 9 million per gram of substance whereby the bacterias consumed the hemicellulose present in the mixture in an amount of 4%. This fermentation took about 30 minutes, whereupon the bacterias died off to the initial level depending on changed conditions. During a continuous process the fermentation can take place during one or more treatment steps following the kneading step.

After the kneading step the ductile and formable mass is shaped in pieces of portion size or parts of portion size, which pieces are sifted, dried, suitably by means of countercurrent hot air at 90° C, pasteurized, and packed.

The feed prepared in accordance with the Example above, which feed according to the invention has been reduced in its content of hemicellulosic substances, (which cannot be digested by digestion enzymes of carnivores), has been shown to give a completely normal intestinal flora in tests carried out on cats.

In a typical process according to the invention in which a first mixture of cereals has been gelatinized and mixed with a second mixture containing protein, fat, minerals and vitamins and thereafter fermented, the total content of sugars and hemicellulose before and after fermentation is as follows:

| | Content, % of total mixture | |
|---|---|---|
| | Before Fermentation | After Fermentation |
| Fructose | Nil | Trace |
| Glucose | Nil | 0.4 |
| Sucrose | 1.0 | 1.0 |
| Maltose | 0.5 | 0.9 |
| Lactose | 0.4 | 0.4 |
| Inulin | Trace | Nil |
| Hemicellulose (xylose, arabinose) | 1.7 | Nil |

During the fermentation the amount of hemicellulose has been reduced to zero. Hemicellulose is consumed by the bacteria and thus substantially converted into $CO_2$ and water. The amount of glucose appearing after fermentation and the increased amount of maltose are considered to result from the splitting of starch. The removal of hemicellulose results in a reduced supply of nutrients for bacterias in the intestines. Thus, the number of aerobic bacterias in feces from the cat, which had been given a feeding stuff of the invention, was 2-3 millions per gram of substance, of which <100 were coliform rods. In comparative tests with cats, which had been given conventional dry feeding stuffs (pelletized, baked, extruded etc.) based on common cereals such as corn, barley, oats, rye and wheat the number of aerobic bacterias in feces was 100 -1000 millions of bacterias per gram of substance of which the main part was coliform rods.

These quantiative and qualitative differences in the composition of the intestinal bacterias have been shown to be a great importance for the health of the carnivores. It has thus been shown that 3-10% of all cats, which have been given conventional dry feeding stuffs secrete such an amount of struvite crystals in the urinary bladder and in the urethra that urinary tract troubles appear. Cats, which have been given a dry feeding stuff according to the invention do not secrete any struvite crystals and thus do not show any urinary tract troubles either.

Suitable, spore forming hay-bacterias, which can be present on the cereals, which are used in the feeding stuff of the present invention, are *Bacillus subtilis*, *Bacillus lichemiformis*, *Bacillus polymyxa*, *Bacillus macerans*, *Bacillus megaterium* and *Bacillus pumilus*.

Such baterias may, however, in certain cases not be present in the raw material in an amount great enough to give the degree of fermentation desired, in which case they are then added separately and then in such an amount that the total number of hay-bacterias per gram of cereals after heating is 40,000 per gram, suitably up to 75,000 per gram of substance.

A separate addition may be done by adding pure cultures or adding material containing such bacterias, such as grassflour and the like.

Suitable cereals to be used in the invention are barley, wheat, rye, oats, soya beans, peas, and beans, or other cereals having a high content of hemicellulose-containing substances.

The heating of the first mixture in the example above for selection of bacterias and gelatinization of the starch is carried out to a temperature of 76° to 100° C, preferably 76° to 85° C.

The water content of the first mixture should reach 45% by weight, preferably 50% by weight, in order to reach 25% by weight, preferably 30% by weight in the total mixture of the first and second mixtues. If the fermentation is carried out before the second mixture has been added the water content of the first mixture may be reduced to a percent by weight which lies close to the optimum of growth of the haybacteria, usually in the interval 30 to 40% by weight.

The total time for fermentation is usually 30 minutes, but can be varied from 20 to 40 minutes depending on the outer conditions, especially the temperature, which can be varied from 40° to 55° C.

A continuous preparation of a feeding material as above can be done in accordance with the following.

The first mixture is added from a first mixing vessel to a continuous cooker of the screw-type, in which, after addition of water and steam, a selection of the spore-forming hay-bacterias and gelatinization of the starch are carried out. The first mixture thus "boiled" is then continuously transferred to a continuous kneading-mixing apparatus to which the second mixture is fed simultaneously from a second mixing vessel. In the kneading-mixing apparatus, wherein the temperature is controlled to be within the suitable limits indicated above, the fermentation takes place. From the kneader the ductile total mixture is fed to a shaping device, such as contrarotating rollers provided with cavities. The pieces thus shaped are then transferred to a sieve in which free flour and excess from the shaping is sieved away. The shaped pieces are then introduced into a continuous driver in which the water content of the shaped pieces is reduced to 5 to 10%, before they are further transferred to a tunnel oven where a rapid heating is carried out to pasteurize them. From the stock of final products the shaped pieces are then brought to a packing station where the shaped pieces are packed in bags or sacks.

EXAMPLE 2

A first mixture according to Example 1 above was mixed with water to 50% by weight, whereupon the mixture was heated to 80° C by means of steam. The mixture was then cooled to 45° C, which temperature was maintained by external heat supply. The hay-bacterias present in the mixture, about 75,000 per gram of substance were then allowed to ferment the content of hemicellulose-containing compounds of the cereals during 35 minutes, whereupon the second mixture according to Example 1 above was added and an intimate mixture was prepared in a kneader. Upon the addition of the second mixture the water content was compensated in such a way that it was 30% by weight in the total mixture. The mixture kneaded, which was ductile, was shaped in a shaping tool to pieces in the shape of rods having the dimensions 1×5 cm, whereupon they were dried, pasteurized, and packed in bags.

A feeding-stuff thus prepared did not cause any increase of the number of aerobic bacterias in the intestinal tract of the cat and did not cause any excretion of struvite crystals in the urine either.

The positive effect of the feeding material on the intestinal tract of the cat, dog, and mink has been mentioned above. The use of the feeding material is, however, not restricted only to these animals but can be used by all animals having a similar intestinal function.

However, it may be regarded as necessary to gelatinize the content of carbohydrates in feeding materials for carnivores, while for other animals, such as swine, it is preferred to carry out a gelatinization from the dietetic point of view.

In order to improve the palatability of a feed of the invention it may be mixed in a manner known per se with flavoring agents in the form of sugar, cacao, etc. This is preferably done during the final process steps for example, by means of spraying immediately before the pasteurization. The addition of vitamins may also be carried out after the fermentation in order to guarantee the contents of vitamins.

EXAMPLE 3

A first mixtures of carbohydrates according to Example 1 was mixed with water to 50% by weight, whereupon it was heated to 80° to gelatinize the starch and to select the spore forming hay-bacterias. The temperature was then allowed to fall to 50° C whereupon a fermentation was carried out in accordance with Example 2 above. The product thus obtained was then dried and ground, whereupon it was mixed with a second mixture according to Example 1 above, in flour form and an intimate mixing was carried out. The total mixture was then pasteurized and packed in sacks.

Such a dry product may suitably be given in dry condition to swine or be mixed with water to a paste for feeding to mink. The components of the fed are thereby previously adapted to the needs of the respective type of animal.

EXAMPLE 4

According to Example 1 a first mixture was prepared, gelatinized and mixed with a second mixture. During the subsequent kneading step the amount of bacteria, the total sugar content and the water content was determined at certain intervals as presented in the table below. The temperature at the beginning of the kneading step was 50° C.

| Minutes of kneading | Total amount of bacteria and spores per gram of substance | Total sugar content (%) incl., hemicellulose | Water content (%) |
|---|---|---|---|
| 0 | 100,000 | 4.0 | 31.5 |
| 10 | 4,000,000 | 3.5 | 26.4 |
| 20 | — | 3.0 | — |
| 23 | 9,200,000 | — | 27.8 |
| 30 | 1,000,000 | 2.0 | 24.6 |

I claim:

1. A method of modifying a feed mixture which comprises about 30–70% by weight of carbohydrate sources selected from the group consisting of corn, barley, wheat, rye, oats, soya beans, peas and beans, said carbohydrate sources forming substantially all of the carbohydrate material present in the modified feed mixture, said mixture further comprising proteins, fats, minerals and vitamins to provide a complete modified feed mixture for an animal, the method comprising fermenting all carbohydrate material present in the complete feed mixture with spore-forming hay bacteria for about 20–40 minutes.

2. A method according to claim 1 wherein, prior to fermentation, the carbohydrate sources are heated to gelatinize the carbohydrate content thereof, and while hot, are mixed with the proteins, fats, minerals and vitamins to form the complete feed mixture.

3. A method according to claim 1 wherein the final steps comprise shaping, drying and pasteurizing the complete feed mixture.

4. A method according to claim 2 wherein the carbohydrate sources are mixed with water prior to heating.

5. A method according to claim 4 wherein the total amount of water added is 25 to 50% by weight of the carbohydrate sources.

6. A method according to claim 2 wherein the carbohydrate sources are heated to a temperature of 76° to 100° C, and preferably to 76° to 85° C.

7. A method according to claim 4 wherein the proteins, fats, minerals and vitamins are added in such an amount that the total water content is 25% to 35% by weight of the complete feed mixture.

* * * * *